July 16, 1935.　　　G. B. WARREN　　　2,008,527
BEARING
Filed Oct. 26, 1932
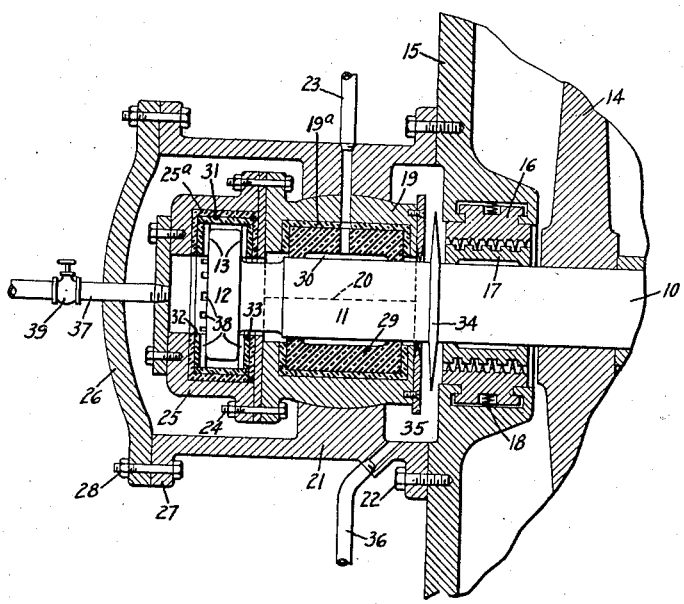
Inventor:
Glenn B. Warren,
by Chas. V. Tullar
His Attorney.

Patented July 16, 1935

2,008,527

UNITED STATES PATENT OFFICE 2,008,527

BEARING

Glenn B. Warren, Schenectady, N. Y., assignor to General Electric Company, a corporation of New York Application October 26, 1932, Serial No. 639,586

6 Claims. (Cl. 308—134)

The present invention relates to bearings and more particularly to the kind of guide and/or thrust bearings for which water is used as lubricant. This kind of bearings is advantageous in all cases where the lubricant, that is the water, may come in contact with steam as is the case with bearings for elastic fluid turbines.

The object of the invention is to provide an improved construction and arrangement for a bearing of the kind specified.

According to my invention I provide the bearing with a lining made of fibrous material united by an artificial resin such as a phenolic condensation product.

Another important feature of my invention is that the lubricant for the bearing, that is the water, which at the same time serves as a cooling medium for the bearing, is used for condensing and carrying away the steam leaking along the shaft of an elastic fluid turbine. In order to prevent leakage steam from coming into direct contact with the lubricant near the shaft, and particularly to prevent leakage steam from entering the bearing, I provide suitable deflecting or guide means for the leakage steam, as well as for the lubricant, for guiding both steam and water to a special chamber in which they are mixed and the leakage steam thereby condensed.

Other features of my invention will be more fully understood from a consideration of the following description and the claims appended thereto in connection with the accompanying drawing which forms a part of my specification.

In the drawing, I have shown by way of example a combined guide and thrust bearing in accordance with my invention.

The rotary shaft 10 comprises a journal portion 11 supported by a guide bearing and another portion 12 defining shoulders 13 supported by a thrust bearing. In the present instance I have shown the shaft 10 as carrying a bucket wheel 14 of an elastic fluid turbine. The turbine has an outer casing 15 carrying a portion 16 of a packing for preventing elastic fluid from leaking along the shaft. Another portion 17 of the packing is fastened to the shaft. The portion 16, as shown in the drawing, is held by a dove-tail connection with the casing 15 and is yieldably forced towards the other portion 17 by the provision of springs 18. Such packing may be provided for the high pressure end, as well as the low pressure end of the turbine.

The guide bearing comprises a pillow block 19 having an upper and a lower portion split along a horizontal plane through the center of the shaft as indicated at 20. The block 19 is supported by a pedestal 21 which in turn is secured to the outer casing 15 by means of bolts 22. A pipe 23 registering with openings in the pillow block and the pedestal is provided for conducting lubricant to the bearing. Fastened to the left-hand end of the pillow block by means of bolts 24 is a cap 25 forming a part of the thrust bearing. The left-hand end of pedestal 21 is closed by a plate 26 fastened to flanged portion 27 of the pedestal by means of bolts 28. The bearing so far described may be considered typical of any kind of combined guide and thrust bearing.

In order to obtain a satisfactory lubrication and to prevent oily lubricant from coming into contact with leakage fluid and being conducted to the condenser or like point, I provide according to my invention the bearing with linings made of fibrous material united by an artificial resin such as a phenolic condensation product, and use water for lubricating the bearing. In the present example I have shown the guide bearing as being provided with a lining 29 held in a recessed portion of the bearing pillow block and made at least partly of a phenolic condensation product. The water is supplied through conduit 23 and conducted along and around the journal through grooves 30 in the bearing lining. In a preferred embodiment of my invention I supply water at a pressure of the order of the pressure in the high pressure end of the turbine as in this case the water acts as a sealing means for minimizing the leakage of steam.

The thrust bearing is similarly provided with a lining made of fibrous material united by an artificial resin such as a phenolic condensation product. In the drawing I have shown a lining comprising a sleeve 31 and two ring members 32 and 33. The latter engage the shoulders formed on the shaft and take up the thrust thereof. In order to minimize the amount of leakage fluid entering the bearing which would undesirably affect the lubrication I arrange, between the bearing and the packing, means for deflecting leakage fluid coming from one side and lubricant from the other. In the present instance I have shown an annular guide vane 34 between the bearing and the packing fastened to the shaft. With this arrangement the steam leaking through the packing is deflected outwardly and thus substantially prevented from entering the bearing. The leakage steam together with the water are collected in a chamber 35 defined between the outer turbine casing and the bearing, in which chamber the leakage steam is condensed by the water. The water with the condensate is drained from the chamber through a pipe 36 which serves to carry the fluid to a suitable point, such as a condenser, not shown. Between the bearing lining and the pillow block of the guide bearing I provide heat insulating means such as mica rings on plates 19a for diminishing the heat transfer from the shaft to the pillow block. For the thrust bearing I have shown similar heat insulating means 25a.

In order to obtain a sufficient circulation of lubricant through the thrust bearing I provide a conduit 37 at the left-hand end of the bearing for draining a portion of the lubricant through the outer end of the thrust bearing. The annular ring members of the lining for the thrust bearing have recesses or grooves 38 for securing an easy flow of lubricant to the surface of the thrust bearing. The amount of lubricant conducted through the thrust bearing can be regulated by the provision of a valve means 39 in the conduit 37. It will be readily seen that closing of the valve means permits less lubricant to be drained through conduit 37 whereby more lubricant is supplied to the chamber 35, and vice versa.

What I claim as new and desire to secure by Letters Patent of the United States, is:—

1. In an elastic fluid engine, an outer casing, a rotatable shaft, a bearing for supporting the shaft, a packing between the shaft and the casing for minimizing the leakage of elastic fluid along the shaft, the bearing including a lining made of fibrous material and an artificial resin uniting the fibrous material, means for conducting lubricating water to the bearing, a deflector between the bearing and the packing for preventing leakage fluid from entering the bearing near the shaft and a chamber defined between the bearing and the casing for receiving leakage fluid from the engine and water from the bearing to condense the leakage fluid.

2. In an elastic fluid turbine having a casing and a shaft extending through the casing, a bearing for supporting the shaft being fastened to the casing, the bearing having a lining made of fibrous material, means for conducting lubricating water to the bearing, means between the bearing and the casing for preventing elastic fluid leaking along the shaft from entering the bearing, a chamber being defined between the casing and the bearing for receiving leakage fluid from the engine and water from the bearing to condense the leakage fluid, and a drain conduit for the chamber for discharging the mixture of water and condensed leakage fluid.

3. In a combined horizontal guide and thrust bearing having linings made at least partly of a phenolic condensation product, means for conducting water to the guide bearing, adjustable means for draining a portion of the water from the thrust bearing, a chamber formed at one end of the guide bearing for receiving water from the latter, and other means for draining another portion of the water from the chamber.

4. In an elastic fluid turbine, an outer casing, a rotatable shaft, a bearing for supporting the shaft, a package between the shaft and the casing for minimizing the leakage of elastic fluid along the shaft, the bearing including a lining made of fibrous material and a phenolic condensation product, means for conducting lubricating water to the bearing, a deflector between the bearing and the packing for preventing leakage fluid from entering the bearing near the shaft and a chamber defined between the bearing and the casing for receiving leakage fluid from the turbine and water from the bearing to condense the leakage fluid, the water being conducted to the bearing at a pressure of the order of the elastic fluid pressure in the high pressure end of the turbine.

5. In a horizontal combined guide and thrust bearing having linings made of fibrous material and a phenolic condensation product, means for conducting water to the guide bearing, a chamber communicating with the end of the guide bearing opposite the thrust bearing to receive water discharged from the guide bearing, adjustable means for draining a portion of the water from the thrust bearing, and other means for draining water from the chamber, and heat insulating means for the linings.

6. In a steam turbine, an outer casing, a rotatable shaft, a guide bearing for supporting the shaft, a packing between the shaft and the casing for minimizing the leakage of steam along the shaft, the bearing having a lining of fibrous material, means for conducting lubricating water to the bearing, a chamber defined between the bearing and the casing for receiving leakage steam from the turbine and water from the bearing to condense the leakage steam, a cap fastened to the face of the bearing defining an annular recess for receiving a collar formed on the shaft, a lining of a phenolic condensation product on the wall defining the recess engaging the sides of the collar to take up axial thrust of the shaft, and means for conducting lubricating water from the guide bearing into the recess.

GLENN B. WARREN.